May 5, 1970   J. PECHAMAT ETAL   3,509,791
WEAPON FIRING SYSTEM INCLUDING A SEISMIC AND
RADIATION RESPONSIVE CONTROL
Filed May 16, 1969   4 Sheets-Sheet 1

3,509,791
WEAPON FIRING SYSTEM INCLUDING A SEISMIC
AND RADIATION RESPONSIVE CONTROL
Jacques Pechamat and Henri Piazza, Toulouse, and Pierre
  Gouhier, Blagnac, France, assignors to the French
  State represented by the Minister of Armed Forces,
  Ministerial Delegation of Weapons, Technical Delega-
  tion of Land Weapons, Manufacturing Workshops of
  Toulouse, Paris, France
       Filed May 16, 1969, Ser. No. 825,378
  Claims priority, application France, May 17, 1968,
                         152,247
                  Int. Cl. F41d 11/00
U.S. Cl. 89—135                                    8 Claims

ABSTRACT OF THE DISCLOSURE

A weapon firing system is provided with a control including a seismic sensor and an infrared radiation sensor. A source of power is provided which is connected to the seismic sensor and which is connected via a switch with the infrared radiation sensor. The switch is actuated by the seismic sensor so that the infrared radiation sensor does not constitute a constant drain on the power source. The seismic sensor is capable of distinguishing between different types of vehicles characterized by different seismic frequency patterns. The system is provided with a weapon firing control having a jamming circuit which avoids the consequences of transients when signals are initially received from the sensors. The weapon firing control circuit includes a thyristor.

DRAWING

DETAILED DESCRIPTION

This invention relates to a selective horizontal-action weapon firing device.

All known devices hitherto employed for vehicle scanning require some mechanical contact with the vehicle in question, such as ground pressure pick-off, a special wire which ruptures when overridden by tank tracks, or the like.

The drawbacks arising from the use of such devices are numerous: difficulties in concealing them, merely tolerable scanning efficiency, especially in wire cut-off devices, by reason of the large variety of chassis in use.

The device to which the present patent relates is equipped with certain original means for vehicle scanning and localization, guaranteeing selective horizontal-action weapon firing from a distance and without any mechanical contact.

Figure 1:
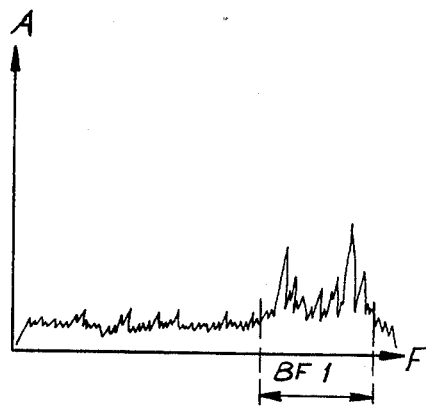
FIGURE 1 is a chart illustrating the characteristic seismic frequencies of one type of vehicle.
Figure 2:
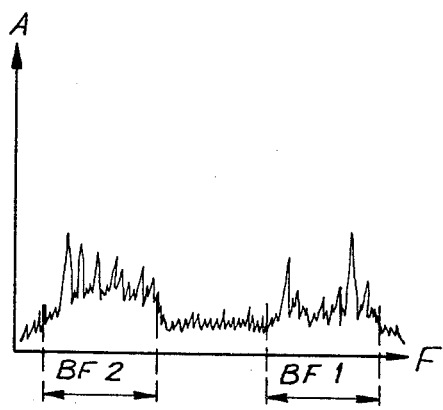
FIGURE 2 is a chart illustrating a pattern of frequencies for a second type of vehicle.

FIGURES 1 and 2 illustrate the theoretical principle of vehicle selection. Numerous trials have warranted the categorization of various types of vehicles according to the ground disturbances which they set up in transit. FIGURE 1 shows the seismic amplitude-frequency spectrum produced by a rubber-tired vehicle. This spectrum is level in the low-frequency region. There is a concentration of seismic power at the higher frequencies this being caused mainly by engine vibration transmitted to the ground through the springs and running carriage. They are of comparatively low amplitude because of absorption by the tires. On the other hand, a heavy Caterpillar track vehicle exhibits a different characteristic seismic picture as shown in FIGURE 2. Whatever the speed of the vehicle, ranging currently from about 6 to 50 m.p.h., the spectrum is crowded with high-amplitude low frequencies. Toward the higher frequencies, the spectrum is akin to that of FIGURE 1. Its amplitudes are, however, slightly higher since they are better transmitted by the undercarriage. Thus, a distinction can be established between the various types of vehicle according to the seismic spectrum structure they produce. A seismic sensor, selectively sensitive in the low frequency range ($LF_2=BF_2$ band) thus allows selection of the type of vehicle which is to be destroyed.

Localization of the vehicle on the center line of fire, according to the present invention, depends on an infrared static detector. All bodies as a matter of fact emit their own individual infrared radiation, the wavelengths of which depend on the nature, surface condition and temperature of the particular body. Detection of the infrared band emitted by a vehicle furnishes in this way a wholly static and therefore undetectable means of spotting the presence of a vehicle. If the detector unit has a very narrow field of sight, whose center line coincides with the line of fire of an associated weapon, the energy detected during the travel of the vehicle and converted into a signal of suitable characteristics will provide an accurate determination of the moment to begin firing. Experience has shown that, by making use of the spectral field corresponding to the purely thermal radiation of a body at ambient temperature, one can avoid the infrared disturbance of the much shorter wave length emanating from the sun. This field is, likewise, full of atmospheric "windows" or belts where infrared absorption by the atmosphere is less.

Figure 3:
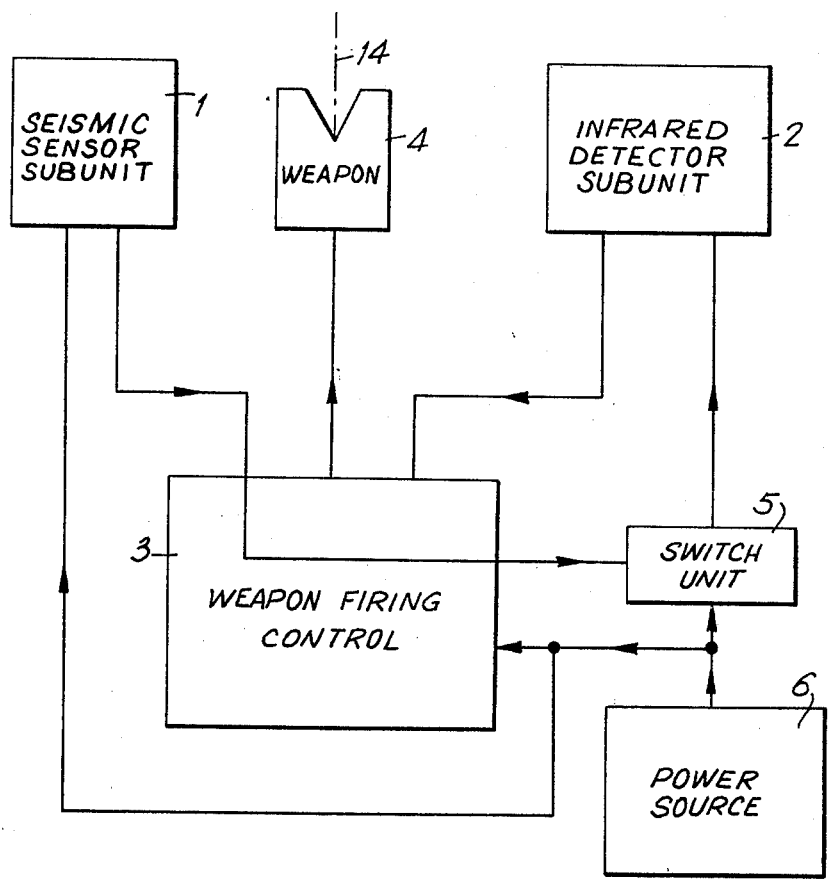
FIGURE 3 is a block diagram of a weapon firing system provided in accordance with the invention.

A selective firing device in accordance with the present invention will therefore comprise three functional subassemblies as seen in FIGURE 3. Two peripheral subassemblies 1 and 2 connected respectively with the seismic sensor and infrared detector collate the data which is then transmitted by them to the functional unit 3 which makes use of the data and controls the firing of the weapon 4. As a matter of fact, for reasons of power consumption, the operation of subunits 1 and 2 is subject to their proceeding in sequence. Unit 1 permanently takes care of the lookout for seismic vibrations. When a destruction-worthy vehicle enters the field of seismic detection, an order signal goes to main unit 3 which by means of a switch unit 5 connects the source of power 6 to the electronic infrared detector circuits of subunit 2. Unit 2 being thus started up sends an order to main unit 3 when the vehicle crosses the centerline of fire. This main unit then operates the power circuit for ignition of weapon 4. When the vehicle moves away from the weapon without having crossed the line of fire (e.g., by turning back or coming to a halt), the seismic alarm stops. The infrared detector unit 2 is disconnected from power source 6, subunit 1 remaining in operation to insure a constant watch on seismic movement.

To make the invention clearer, without in any way limiting it, one particular method of exploiting the principles of seismic selection and optical localization of target is described below.

Figure 4:
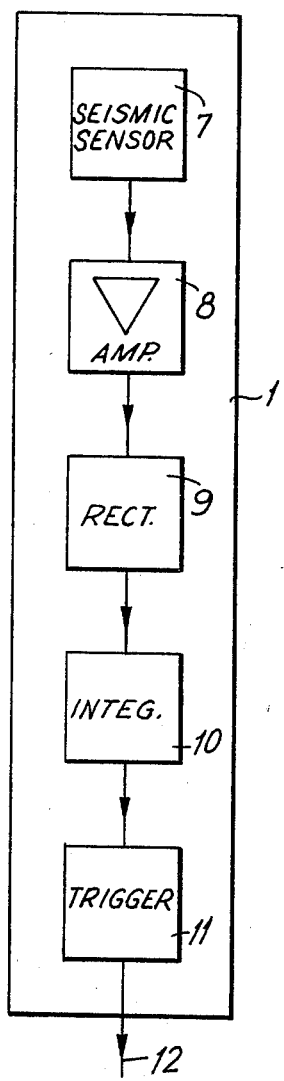
FIGURE 4 is a block diagram of one of the sensor sub-units of the circuit of FIG. 3.
Figure 5:
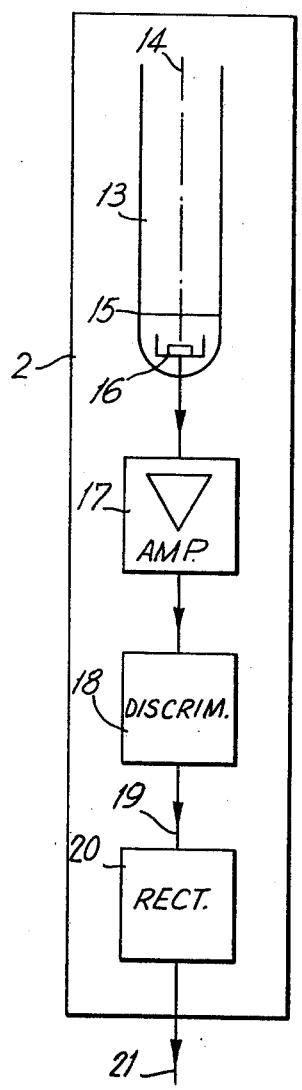
FIGURE 5 is a circuit block diagram of another of the sensor sub-units of the circuit of FIG. 3.

FIGURE 4 illustrates the operation of subunit 1 connected with the seismic sensor. A sensitive sensor 7 converts earth vibrations produced by any vehicle entering its detector area into electric signals. Such a sensor, in accordance with the invention, will be selectively sensitive in the low frequency range $LF_2$ ($BF_2$ in the drawings). This selectivity can be intrinsic to the seismic sensor or can be imparted to it by means of selective filters covering the range of frequencies under consideration. In the example in FIGURE 4, the sensitive component of the sensor, a weakly damped mechanical oscillator, excited by seismic vibrations, has a high efficiency factor, giving the sensor excellent selectivity and sensitivity in the effective frequency range ($LF_2=BF_2$). The signal emanating from sensor 7 is amplified in the low noise amplifier 8. Unit 9 rectifies the amplified signal and feeds it to integrator 10. The signal thus integrated releases the trigger cock 11 when its value reaches a preset threshold, thus setting the alarm (logic one state appearing on output 12 of system 1 while the alarm lasts). To assure maximal independence to the searcher subunit, the active parts composing it will be chosen for extremely low consumption. FIGURE 5 shows the operation of the vehicle detector and targeting optical subassembly. A collimator 13 with axis 14 explores a narrow field of vision focused on the line of fire. An infrared filter 15 screens out shortwave radiations of solar or other origin. The luminous energy thus selected reaches a thermal or quantizational photoconductive detector: selenium cell, node finder, or the like which transform it into an electric signal.

Atmospheric absorption is necessarily a factor governing the choice of infrared detector spectral area. For instance, a photoelectric finder offering maximal sensitivity up toward 10 microns (mean heat radiation wavelength of a body brought to ambient temperature) allows usage of the 8 to 13 micron atmospheric bands. The signal emitted from 16, amplified in unit 17 is discriminated in 18 so as to block creeping variations of the mean infrared level. Two kinds of pulsation of opposite polarity may appear on output 19 of unit 18: a positive pulse when the vehicle is at higher than surrounding temperature, negative when its temperature is lower than the environment. Negative pulses are rectified in unit 20. The transit of a vehicle past the infrared detector will be manifested by a positive electric pulse on output 21 of subassembly 2.

Figure 6:
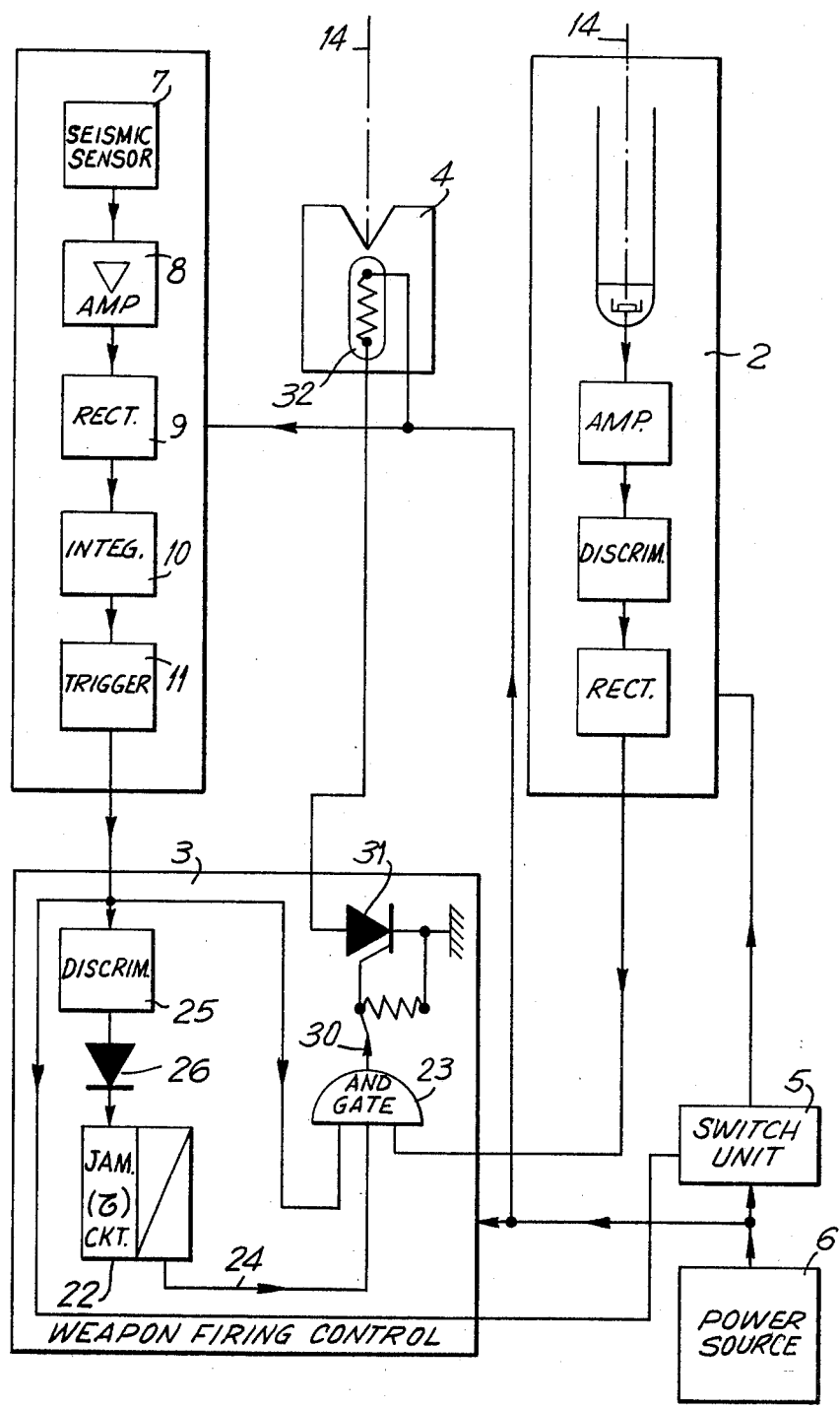
FIGURE 6 is a block diagram illustrating the circuit of FIG. 3 in greater detail.
Figure 7A:
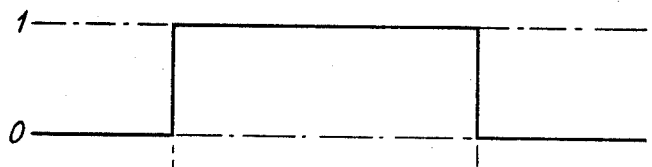
FIGURES 7A–D are charts of different signals appearing in the circuit of FIGS. 3 and 6.
Figure 7B:
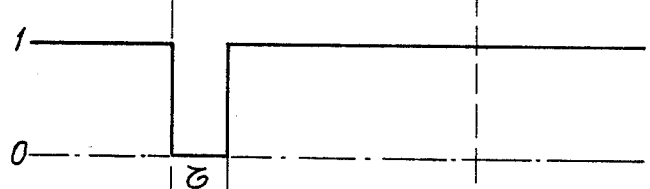
Figure 7C:
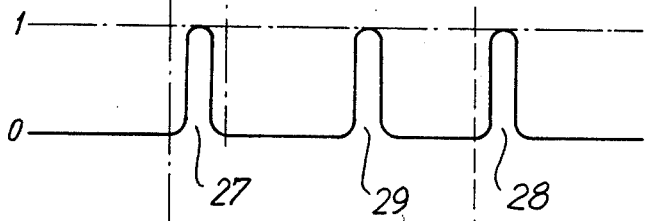
Figure 7D:
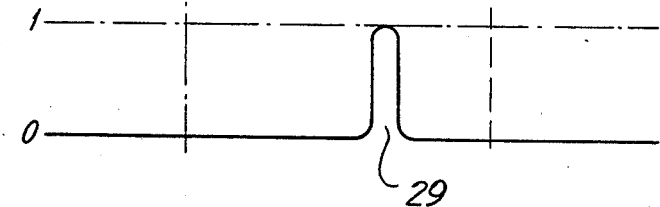

The overall working of the ignition device in accordance with this invention is made clearer by reference to FIGURES 6 and 7. Power source 6 permanently feeds the seismic scanning and alarm subunit 1 and main unit 3. The alarm signal, FIGURE 7A, directly reaches relay unit 5 connecting power source 6 to unit 2. The circuits of the aforesaid subunit are then traversed by transient signals which may simulate the passage of a vehicle along the fire axis.

To remedy such disadvantage, a monostable circuit 22 supplies a jamming signal to the three-way AND-gate 23 for the duration of the transient phenomena. Logic zero state appears on output 24 of circuit 22, FIGURE 7B. Circuit 25 discriminates the alarm signal of FIGURE 7A. Diode 26 picks out its positive component which triggers monostable circuit 22 synchronically from the front before the alarm signal. Thus the transitory pulses 27 and 28 of FIGURE 7C appearing at the start and finish of the alarm are blocked by the AND-gate. On the pulse 29 giving evidence of the actual passage of a vehicle on the firing line is transmitted on output 30 of circuit 23. Thyristor 31 then goes live, coupling the fuzing circuit 32 with the source of power. The weapon is then fired.

What is claimed is:

1. A weapon firing system comprising first means for seismically determining the presence of a mobile object, weapon firing means, and radiation responsive means having a line of sight corresponding with that of the weapon to be fired, said radiation responsive means upon being actuated by said first means sensing the location of said object in said line of sight and actuating the firing means.

2. A system as claimed in claim 1 wherein the radiation responsive means is sensitive to infrared radiation.

3. A system as claimed in claim 2 wherein the first means is a means capable of distinguishing between seismic frequency patterns of different mobile objects.

4. A system as claimed in claim 3 comprising a power source for said first and radiation responsive means, and switch means between said source and radiation responsive means and activated by said first means.

5. A system as claimed in claim 4, said firing means comprising means to block actuation of the firing means in response to transients in said first and radiation responsive means.

6. A system as claimed in claim 5 wherein the firing means includes an AND-gate receiving signals from the first and radiation responsive means, a blocking circuit blocking said gate for a limited period following receipt of a signal from said first means, and a thyristor coupled to and operated by said gate.

7. A system as claimed in claim 5 wherein the radiation responsive means includes a filter to discriminate against noise.

8. A system as claimed in claim 5 wherein the first means is a means which distinguishes between vehicles characterized respectively by a relatively low range of frequencies and by the first said range in addition to a second higher range.

References Cited

UNITED STATES PATENTS 3,331,284   7/1967   Case et al. _____ 89—135

RICHARD A. FARLEY, Primary Examiner

C. E. WANDS, Assistant Examiner

U.S. Cl. X.R.

340—258